US006800205B2

(12) United States Patent
Collins

(10) Patent No.: US 6,800,205 B2
(45) Date of Patent: Oct. 5, 2004

(54) METHOD AND MEANS FOR OZONATION OF POOLS AND SPAS

(75) Inventor: Jeffrey W. Collins, Chatsworth, CA (US)

(73) Assignee: Softub, Inc., Valencia, CA (US)

( * ) Notice: Subject to any disclaimer, the term of this patent is extended or adjusted under 35 U.S.C. 154(b) by 167 days.

(21) Appl. No.: 10/208,343

(22) Filed: Jul. 31, 2002

(65) Prior Publication Data

US 2004/0020863 A1 Feb. 5, 2004

(51) Int. Cl.[7] .................................................. C02F 1/78
(52) U.S. Cl. ...................... 210/739; 210/760; 210/765
(58) Field of Search ............................... 210/739, 760, 210/765, 169; 422/186.14; 4/541.2

(56) References Cited

U.S. PATENT DOCUMENTS

| | | | |
|---|---|---|---|
| 4,043,913 A | | 8/1977 | Hintermeister |
| 4,171,256 A | | 10/1979 | Themy |
| 4,829,607 A | | 5/1989 | Huse |
| 4,898,679 A | * | 2/1990 | Siegel et al. ............... 210/752 |
| 4,995,123 A | | 2/1991 | Kern |
| 5,106,589 A | * | 4/1992 | Conrad ................... 422/186.15 |
| 5,151,250 A | | 9/1992 | Conrad |
| 5,591,349 A | * | 1/1997 | Ikeda et al. ................. 210/760 |
| 5,665,228 A | | 9/1997 | Leaverton et al. |
| 6,129,850 A | * | 10/2000 | Martin et al. ............... 210/760 |
| 6,132,629 A | * | 10/2000 | Boley .......................... 210/760 |
| 6,192,911 B1 | | 2/2001 | Barnes |
| 6,217,833 B1 | | 4/2001 | Kolu |
| 6,331,279 B1 | | 12/2001 | Martin |
| 6,342,154 B2 | | 1/2002 | Barnes |
| 6,405,387 B1 | * | 6/2002 | Barnes ........................ 4/541.2 |
| 6,585,898 B1 | * | 7/2003 | Ekberg et al. ............... 210/760 |

FOREIGN PATENT DOCUMENTS

JP  10-066979 A  *  3/1998

* cited by examiner

*Primary Examiner*—Frank M. Lawrence
(74) *Attorney, Agent, or Firm*—William W. Haefliger

(57) ABSTRACT

The method of controlling ozone supply to a pool or spa body of liquid, that includes providing an ozone generator; providing a control valve operatively connected to the generator to control induced flow of ozone to a pool or spa body of liquid, the valve being solenoid controlled; providing a control for timing of operation of the valve; and providing for controlled delivery of ozone via the valve to air supply to the pool or spa or a re-circulating liquid supply to the pool or spa. The invention allows newly designed or pre-existing systems to add ozone gas to a water body, under the control of a valve, without losing sealed integrating of the air delivery system to the water body.

14 Claims, 12 Drawing Sheets

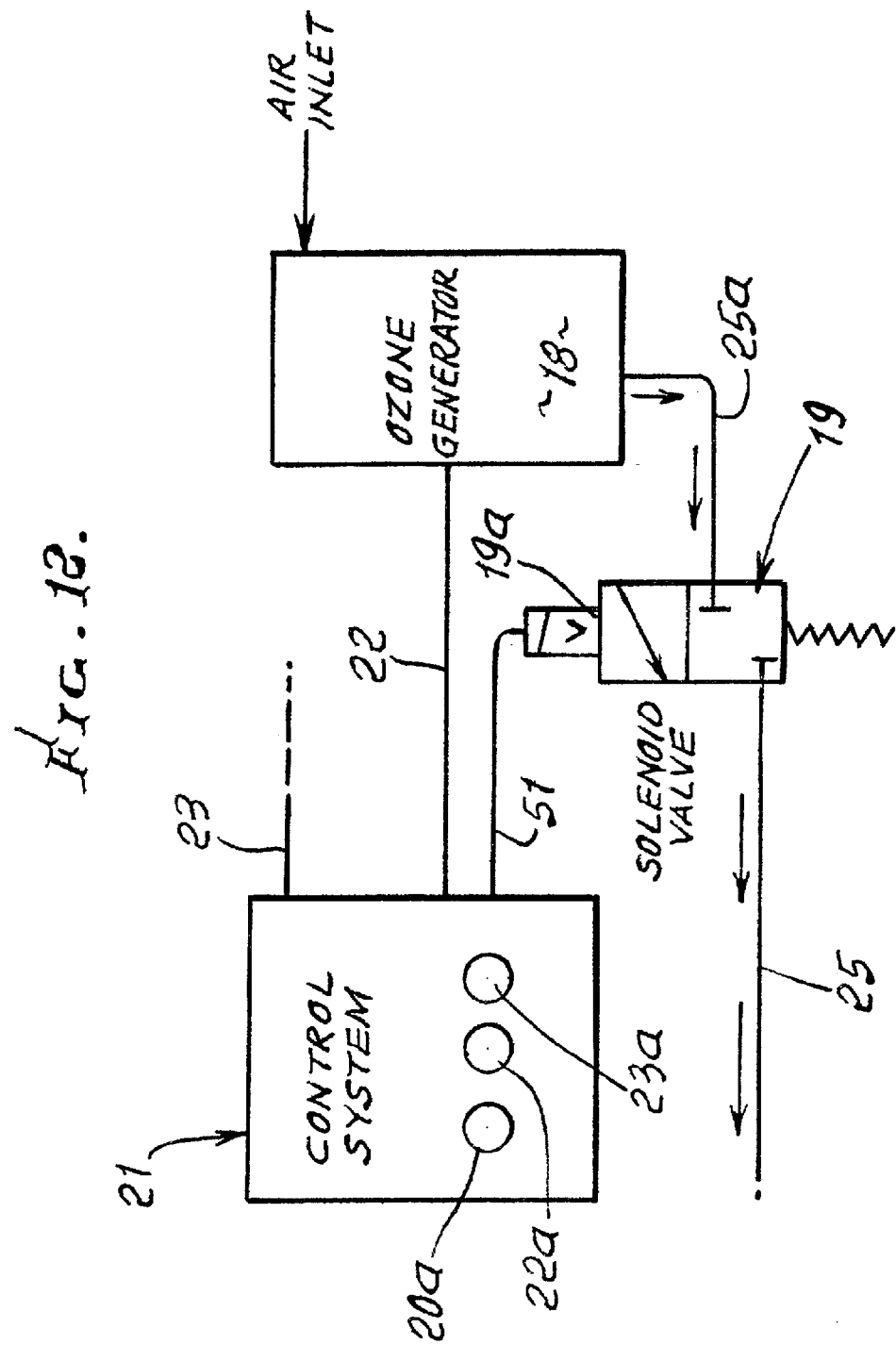

METHOD AND MEANS FOR OZONATION OF POOLS AND SPAS

BACKGROUND OF THE INVENTION

This invention relates generally to water ozonation, and ozone gas control, particularly with respect to pools and spas; and more particularly concerns improvements in systems for accomplishing such ozonation and control.

Ozone is a gas that is utilized, in the present invention, to aid in the oxidation and rejuvenation of spa, pool, pond, etc. water. It is introduced to the water in an effort to achieve beneficial contact with the water. An ozonator is defined herein as a device that creates ozone gas. An ozonator is utilized in a pool or spa installation in order to allow ozone gas to become exposed to the body of water. Ozone acts as an oxidizer in such applications, aiding the sanitizing of the body of water.

Typical installations will consist of either a dedicated system designed exclusively for the ozone application or an existing or complementary system where the ozone is added as either an afterthought to the system or as a secondary system. In both systems, air is constantly being drawn through or being added to the body of water. In circumstances where the addition of ozone is no longer either desired or required, the ozonator is turned off, however air is still being drawn or pushed through the system.

In current designs, either air or ozone is constantly introduced into the water. A side effect of such a system is the operational noise associated with air or ozone being introduced to the system, creating bubbling or gurgling noises in the pool or spa. In the case of units using a pre-existing or complementary air system, the addition of an ozonator or ozone system eliminates the integrity of the air system and makes automatic, manual or user control of the introduction of the air into the system impossible. Another incidental occurrence is that ozone is constantly being introduced to the body of water, greatly elevating both the ozone concentration in the water and in the environment surrounding the body of water.

There is need for improved means for allowing or disallowing the flow of ozone into the system.

There is also need for improved means to either control the amount of ozone being introduced, the level of ozone being introduced, the timing of ozone being introduced or to control the introduction of ozone into the system altogether, in order to solve or curtail many of the aforementioned constraints of current and existing systems being used, as well as introducing the concept of complete control of the flow of ozone being added.

An additional need is for adaptability or use on newly designed, or pre-existing industry art. The methods of connection to and means of controlling said systems vary upon design and material construction and usage. However, none of the aforementioned connection or operating constraints affects the proprietary system or its accompanying design, description or applicable control.

SUMMARY OF THE INVENTION

It is a major object of the invention to provide methods and means to overcome the above problems and deficiencies. The improved method of the invention for controlling ozone supply to a pool or spa body of liquid includes:

a) providing an ozone generator,
b) providing a control valve to control flow of ozone to a pool or spa body of liquid, the valve being solenoid controlled (valve control may be by an ozone generator, or by an existing equipment controller, or by an independent controller),
c) providing a control for timing of operation of the valve,
d) and providing for controlled delivery of ozone via the valve to one of the following:
   i) air supply to the pool or spa,
   ii) a re-circulating liquid supply to the pool or spa,
   iii) dedicated equipment for ozone delivery.

As will be seen, the provision of such an automatic, controlled valve, allows usage of an ozone gas producing device on existing pneumatic lines of a pool or spa without rendering the controls of the system useless, nor requiring the constant addition of ozone to the body of water. The typical application of a spa or pool affords an air control or venturi of sorts to allow aspiration of air into water flowing to the body of water. Such systems may be for the exclusive use of adding ozone gas into the water, or for the addition of air into the stream of water in order to vary the power and feel of the water flow in the pool or spa. The invention allows newly designed or pre-existing air flow systems to accommodate the addition of ozone gas to the body of water, completely controlled by a valve, without losing the sealed integrity of the air system. The valve will completely stop the flow of ozone, allowing the complete control of the ozone into the system. It will also allow units consisting of a separate, independent venturi or other means of exclusively adding ozone gas to completely control the addition of said ozone into the system by controlling the addition of the ozone gas to the system through usage of the valve.

These and other objects and advantages of the invention, as well as the details of an illustrative embodiment, will be more fully understood from the following specification and drawings, in which:

DRAWING DESCRIPTION

FIG. 12 is like FIG. 4 but shows control system control of the solenoid valve.

DETAILED DESCRIPTION

Figure 1:
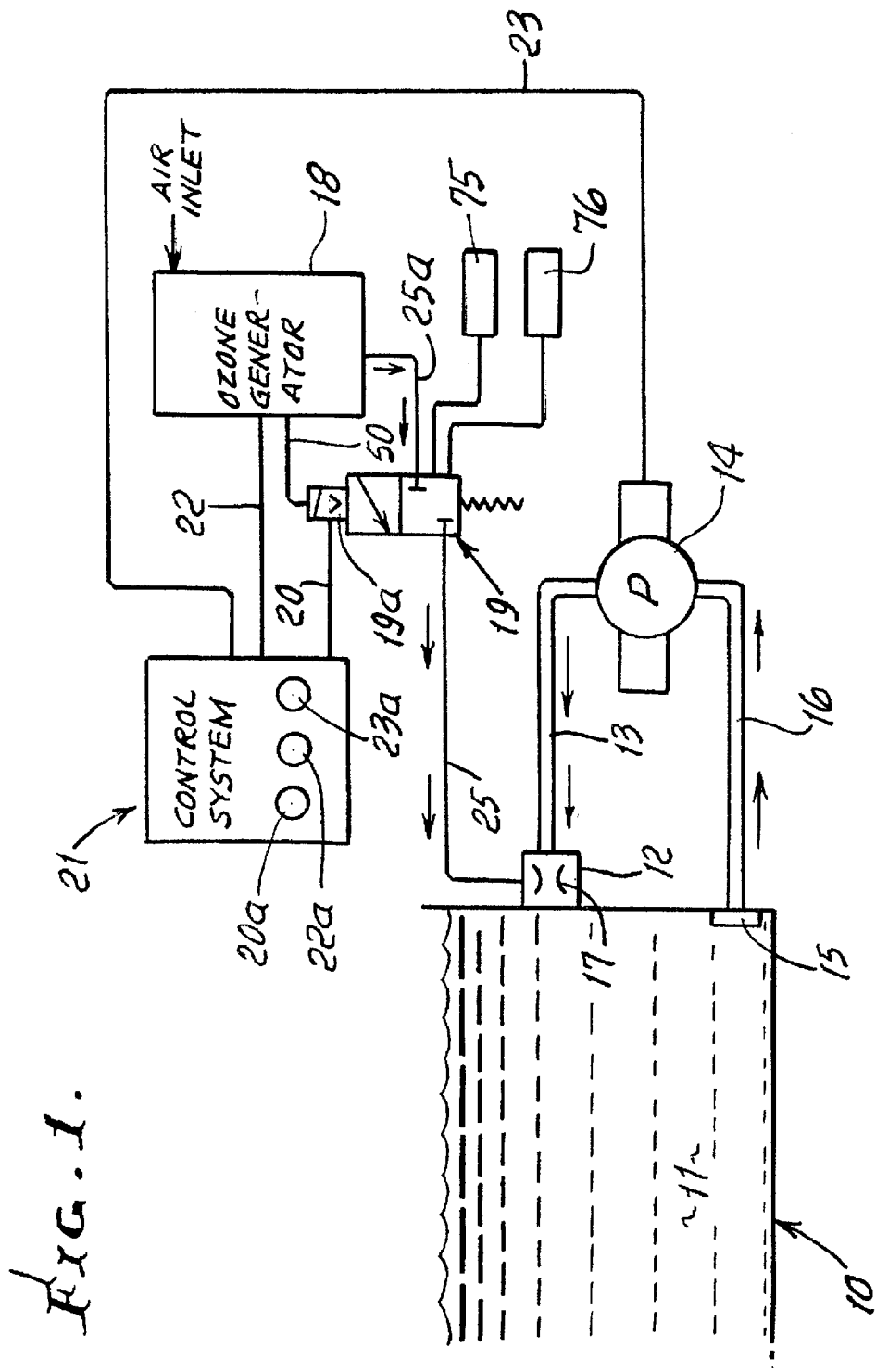
FIG. 1 is a schematic view of a solenoid valve controlled ozone injection system to inject ozone into a jet at the side of a pool or spa.

Ozone is a gas that is utilized to aid in the oxidation and rejuvenation of spa, pool, pond, etc. water. It is introduced to the water in an effort to afford contact with the water.

An ozonator is defined as a device that creates ozone gas. Several methods are utilized, including but not limited to: an ultra-violet (UV) bulb, a corona-discharge (CD) bulb, a corona-discharge (CD) micro-chip or sparking machines. The method of creating the ozone gas is not essential or dependent to the uniqueness or application of this invention.

A solenoid valve is defined as a valve that is actuated by means of an electrical solenoid. The actual means or methodology of opening or closing the valve is not of consequence regarding the uniqueness or application of this patent.

A spa jet or pool jet is defined as a device that facilitates the introduction of pressurized water into a body of water. This water is often filtered, heated or treated in some manner in addition to being distributed to different parts of the body of water. Contained in the jet itself is a construction by which a vacuum is created or a port is allowed for the purpose of drawing or adding air to the stream of water being transferred to the body of water.

A venturi is defined as a component designed to draw air as water or some other air source is drawn through or pushed through it. Typically water or a fluid flows through an orifice, whereas the output side of the orifice has a port attached. Due to the laws of physics, a vacuum is formed at the discharge side of the orifice, due to the Bernouli effect.

An air control is defined as a manually or automatic valve designed and utilized to control the amount of air being introduced to a vacuum created air system.

An ozonator is utilized in a pool or spa installation in order to allow ozone gas to be exposed to the body of water. Ozone acts as an oxidizer in such applications, aiding the sanitization and active sanitizers in the body of water. Such systems have been used in the pool and spa industry for many years.

Typical installations will consist of either a dedicated system designed exclusively for the ozone application or an existing or complementary system where the ozone is added as either an afterthought to the system or as a secondary system. In both systems, air is constantly being drawn through or being pumped through the system. In both applications, ozone gas is constantly being added to the body of water. In circumstances where the addition of ozone is no longer either desired or required, the ozonator is turned off, however air is still being drawn or pushed through the system.

Due to the current designs being employed, either air or ozone is constantly being introduced into the water. A side effect of this system is the operational noise associated with air or ozone being introduced to the system, creating bubbling or gurgling noises in the pool or spa. In the case of the units using a pre-existing or complementary air system, the addition of an ozonator or ozone system eliminates the integrity of the air system and makes automatic, manual or user control of the introduction of the air into the system not possible, for air is constantly being drawn through the ozonator. Another incidental occurrence is that ozone is constantly being introduced to the body of water, greatly elevating both the ozone concentration in the water and in the environment surrounding the body of water.

The invention employs a valve in the system that is controlled by a solenoid or other means. In so much as being controlled by the existing or new spa control, pool control or ozone control the valve will be opened or closed, thus allowing or disallowing the flow of ozone into the system, induced by suction created at the venturi, ozone jet, or jet stream of water.

This invention can be utilized to either control the amount of ozone being introduced, the level of ozone being introduced, the timing of ozone being introduced or to control the introduction of ozone into the system altogether. Such operation will solve or curtail many of the aforementioned constraints of current and existing systems being used, as well as introducing the concept of complete control of the flow of ozone being added.

The system can be utilized on newly designed or pre-existing industry art. The methods of connection to and means of controlling said systems vary upon design and material construction and usage. However, none of the aforementioned connection or operating constraints effect the proprietary system or its accompanying design, description or applicable control.

FIG. 1 shows a pool or spa 10 containing a body of water 11. A jet device is provided at 12, to jet recirculated water in line 13 into the pool, and a pump 14 supplies recirculating water from pool outlet 15, and line 16, to line 13. A flow at 25 of ozone into the jet is induced, as by aspiration into the venturi 17 throat. That flow is supplied at generator 18, and passes at 25a through a control valve 19, typically solenoid controlled at 19a so that the user can control such flow (typically ON-OFF). See line 20 from a control unit 21. The generator is controlled via line 22, and the pump is controlled via line 23. Three controls 20a, 22a and 23a associated with lines 20, 22 and 23 are provided at 21, and may be hand (user) controlled. The solenoid control 19a of valve 19 may be of ON-OFF type. An existing equipment controller 75, and/or an independent controller 76, for the valve, are shown by blocks 75 and 76. These are accommodated by the present invention.

Figure 2:
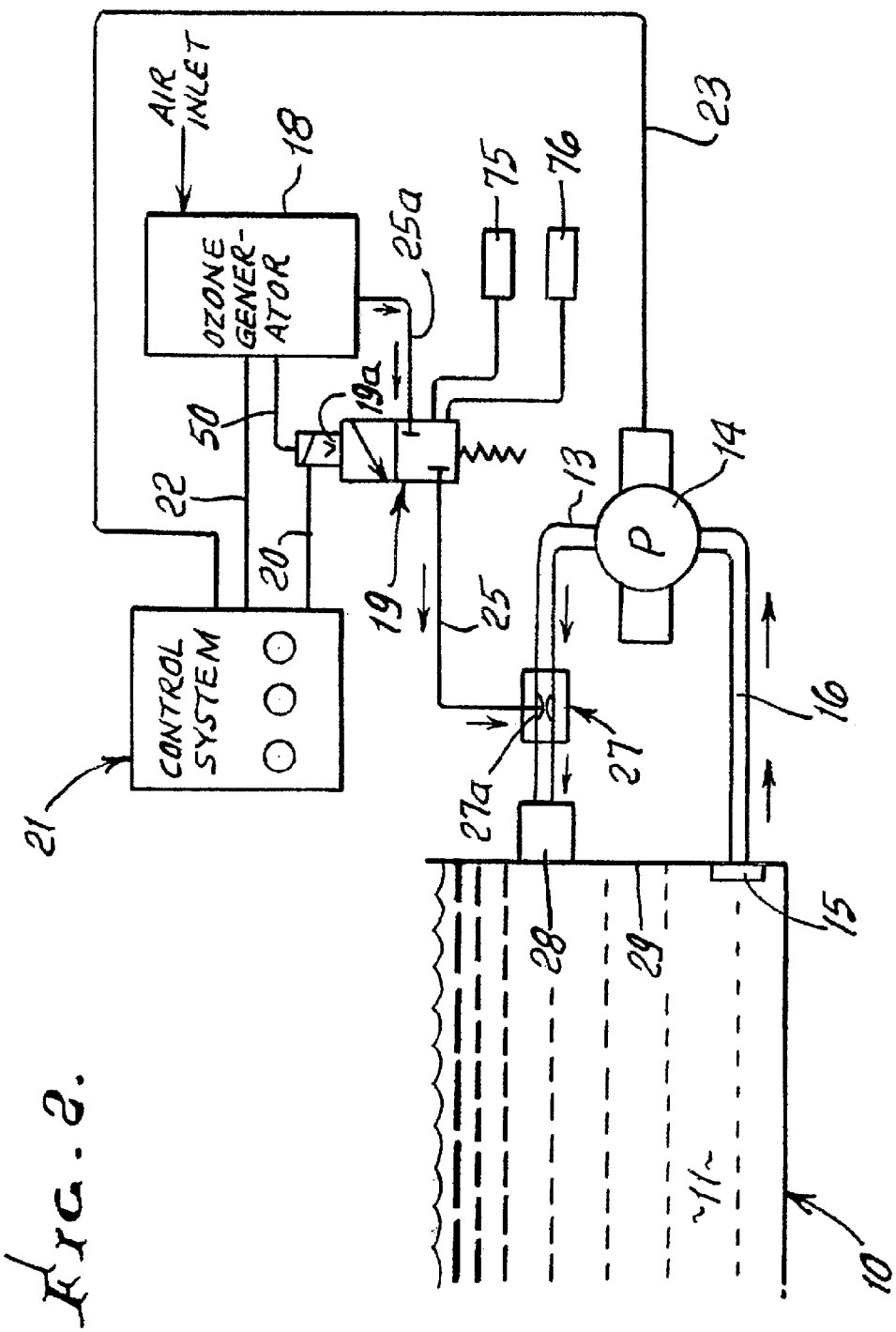
FIG. 2 is like FIG. 1 but shows valve controlled ozone supply to an inline injector for a pool or spa.

The system of FIG. 2 is like FIG. 1, except that ozone flow in line 25 passes to an inline injector 27 having an aspirating venturi 27a (like 17). The injector output (ozone in recirculating water) passes to a return jet 28 at the wall 29 of the pool or spa, for delivery into 11. Flow in 25 is induced by suction, at 27a.

Figure 3:
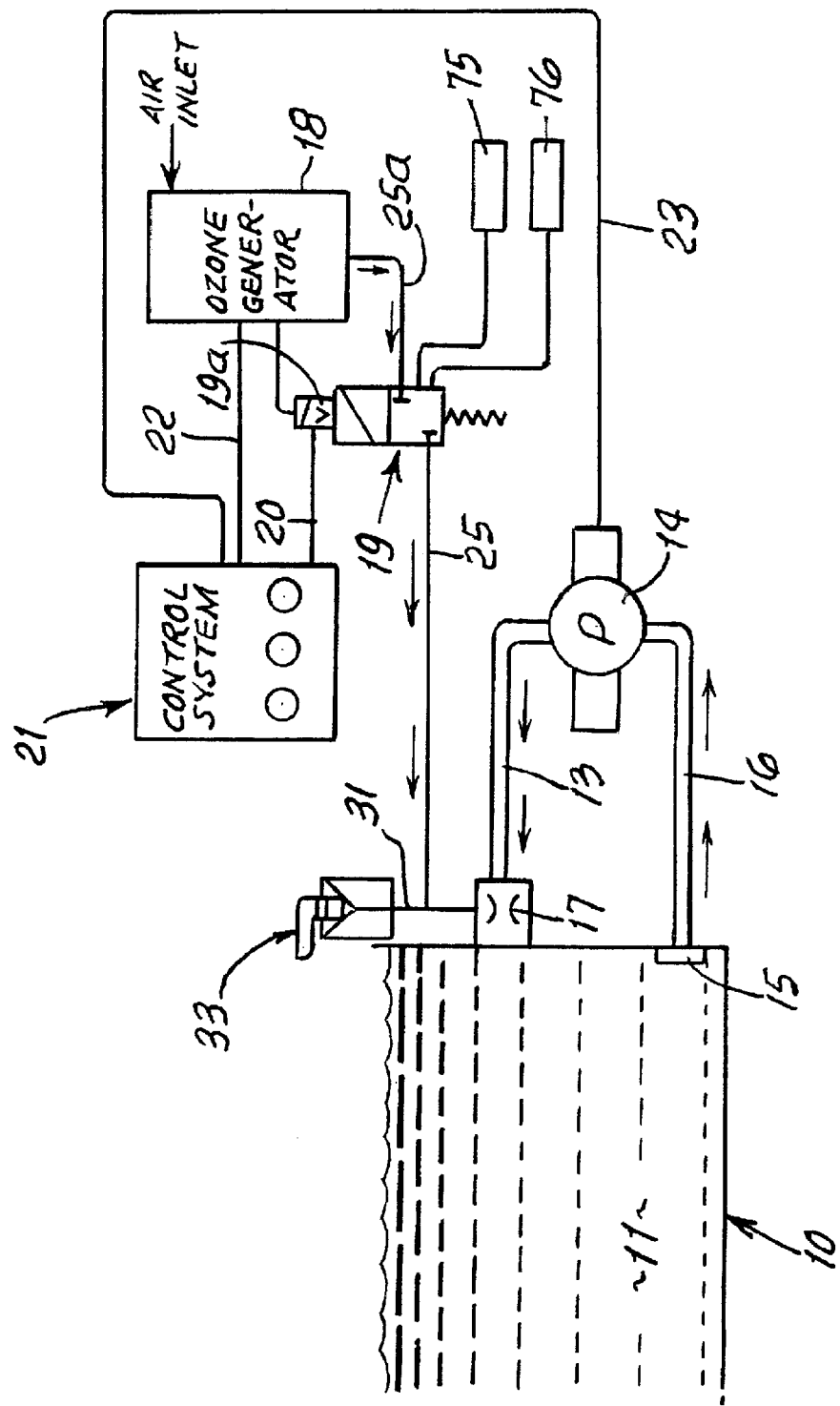
FIG. 3 is like FIG. 1, but shows valve controlled ozone supply to an air stream delivered to a jet or jets of a pool or spa.

The system of FIG. 3 is like FIG. 2 except that the ozone flow in line 25 passes to a line 31 delivering air to return jet 28. That mixed flow of air and ozone is then aspirated into the water flow through venturi 17. An air flow control is indicated at 33. Flows in lines 31 and 25 are induced by suction at 17.

Figure 4:
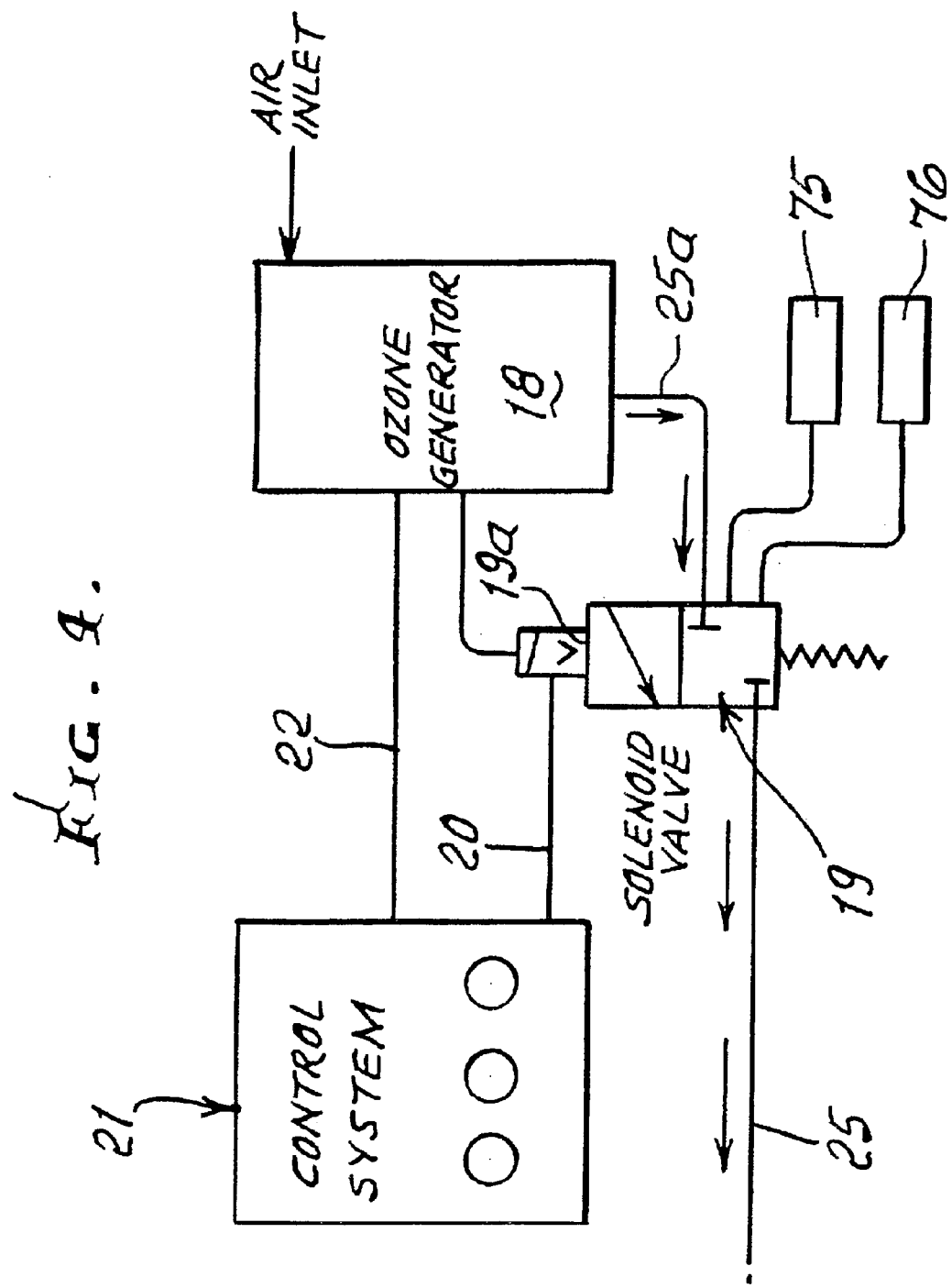
FIG. 4 shows generator, valve, and control elements as used in FIGS. 1–3.

FIG. 4 shows elements 21, 18, 19, 19a, 25a and 25, the same as in FIGS. 1–3.

Figure 5:
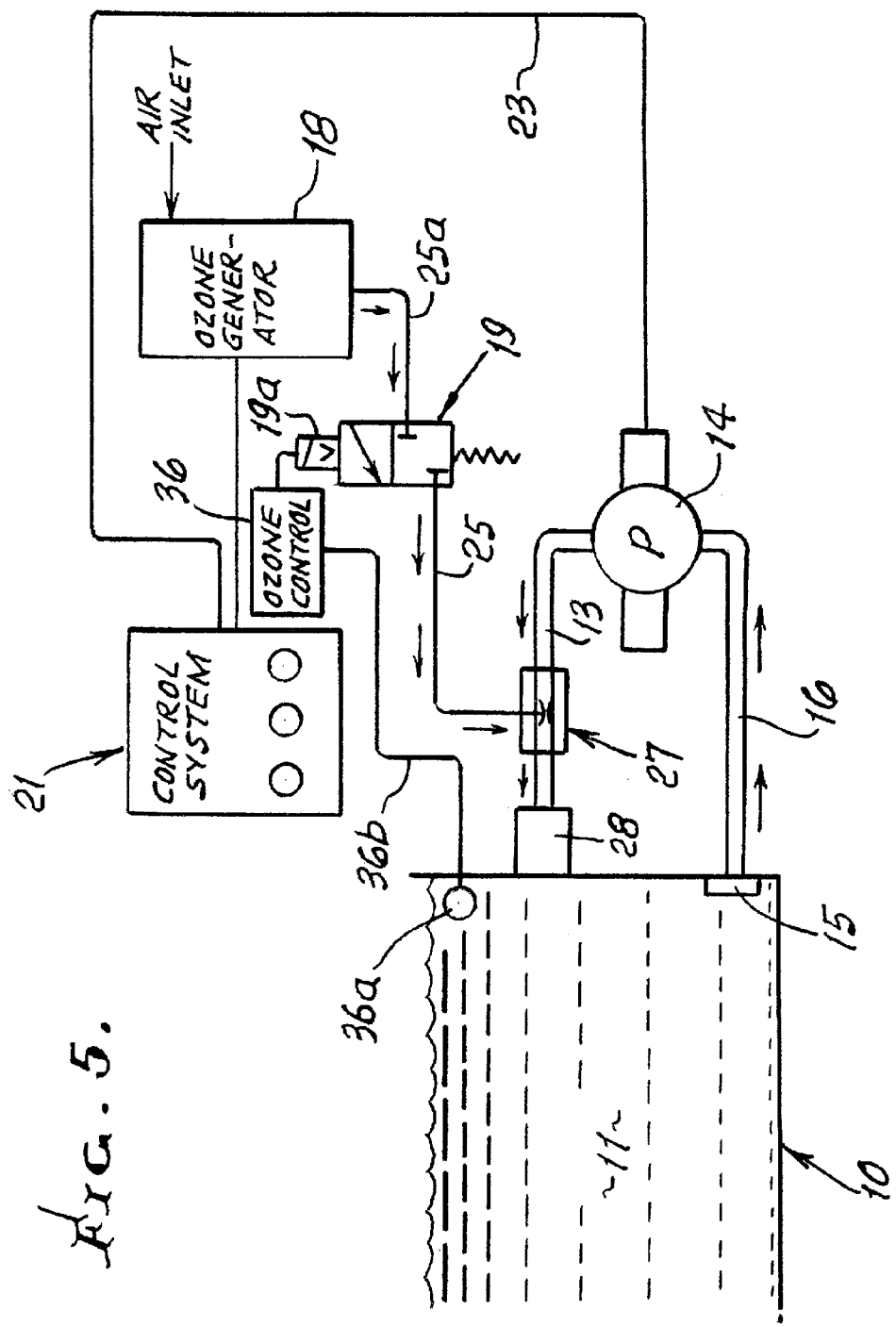
FIG. 5 is like FIG. 1, but shows separate ozone control of the solenoid valve.

FIG. 5 is like FIG. 2, excepting that the solenoid 19a is under the ozone control at 36, i.e. a signal representative of ozone concentration, as in the pool water (see sensor 36a), acts to reduce ozone flow to the line, by shutting off valve 19, when such concentration exceeds a pre-set threshold, and vice versa. See control line 36b.

Figure 6:
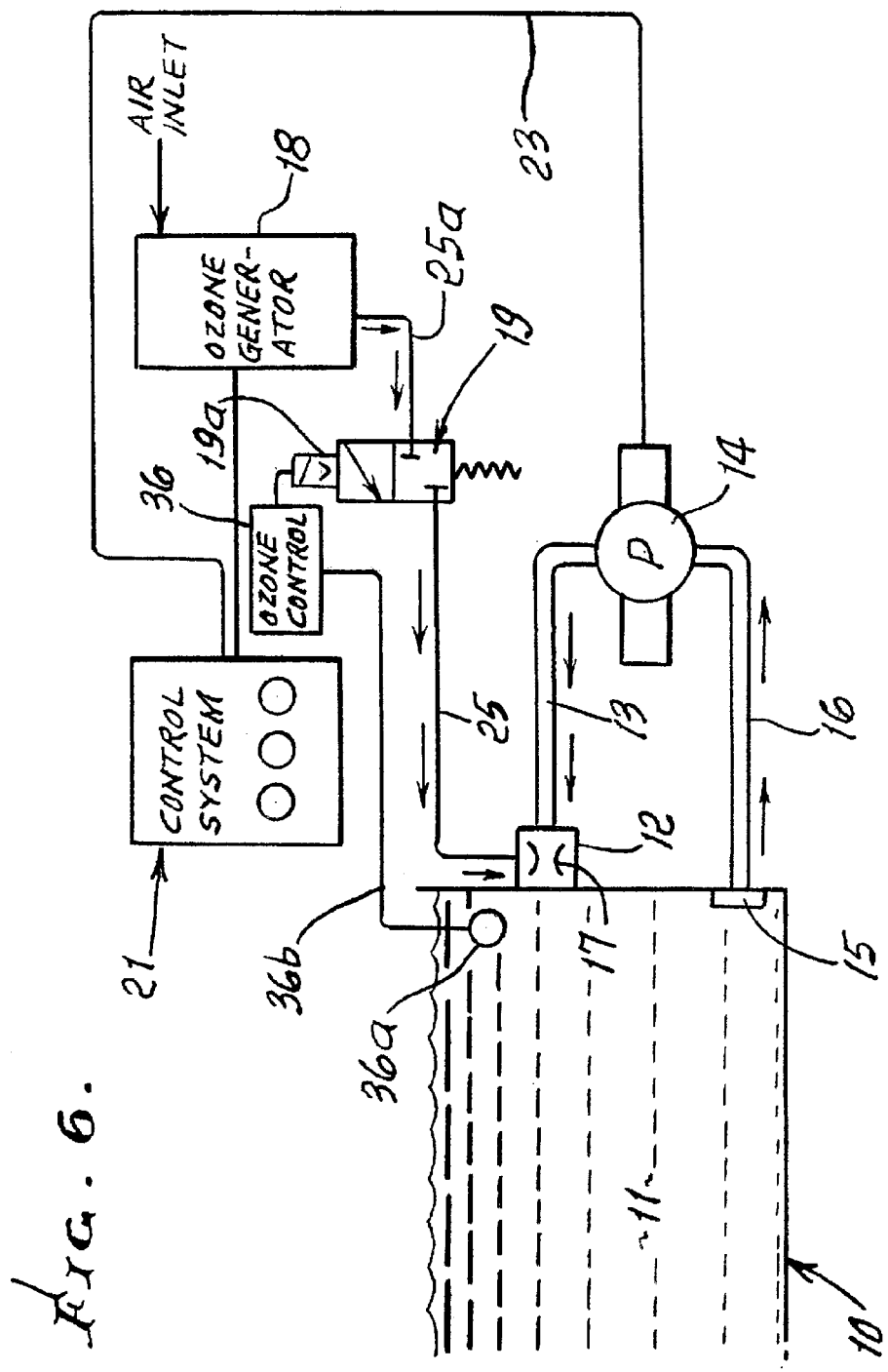
FIG. 6 is like FIG. 2, but shows separate ozone control of the solenoid valve.
Figure 7:
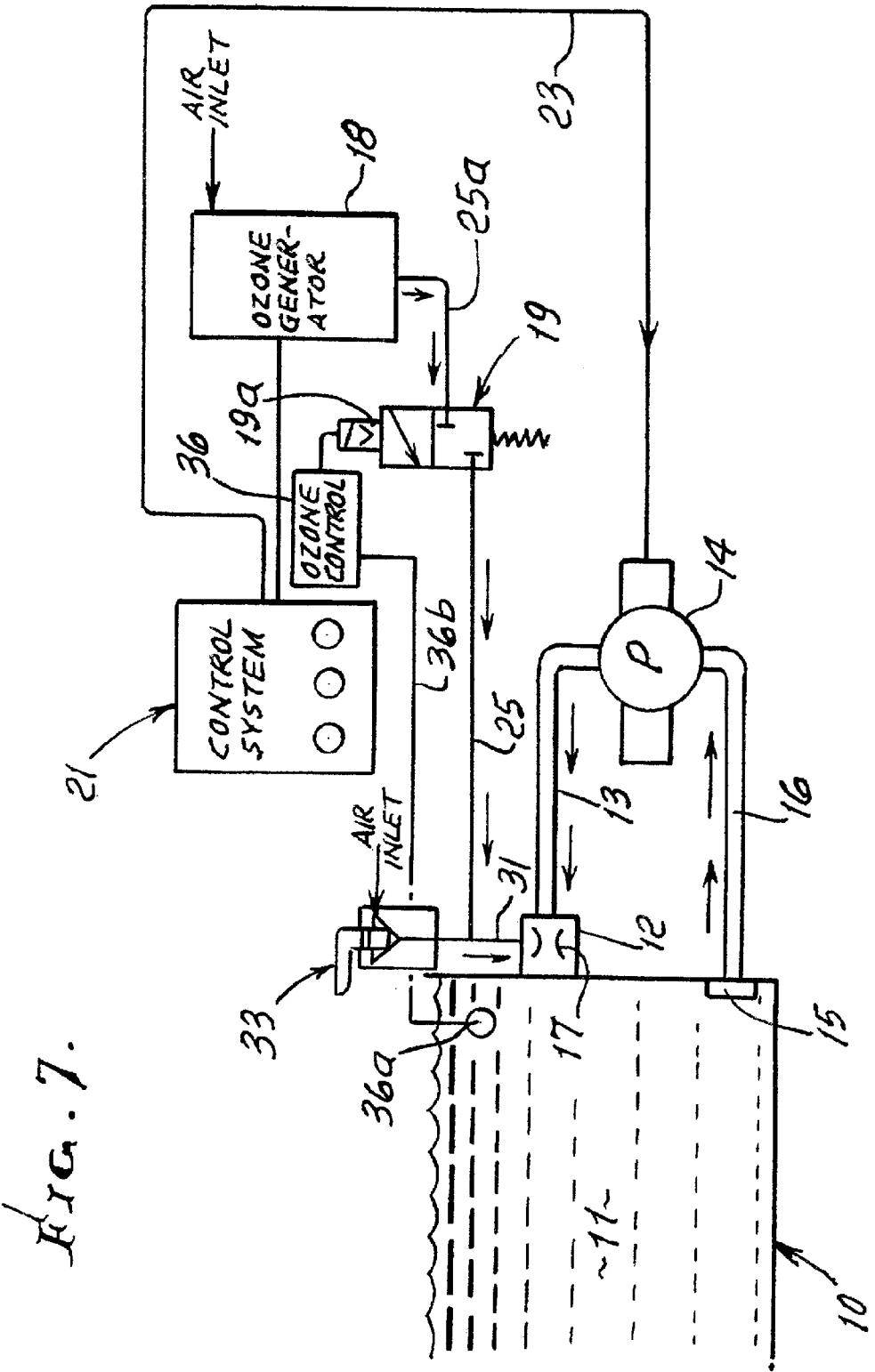
FIG. 7 is like FIG. 3, but shows separate control of the solenoid valve.
Figure 8:
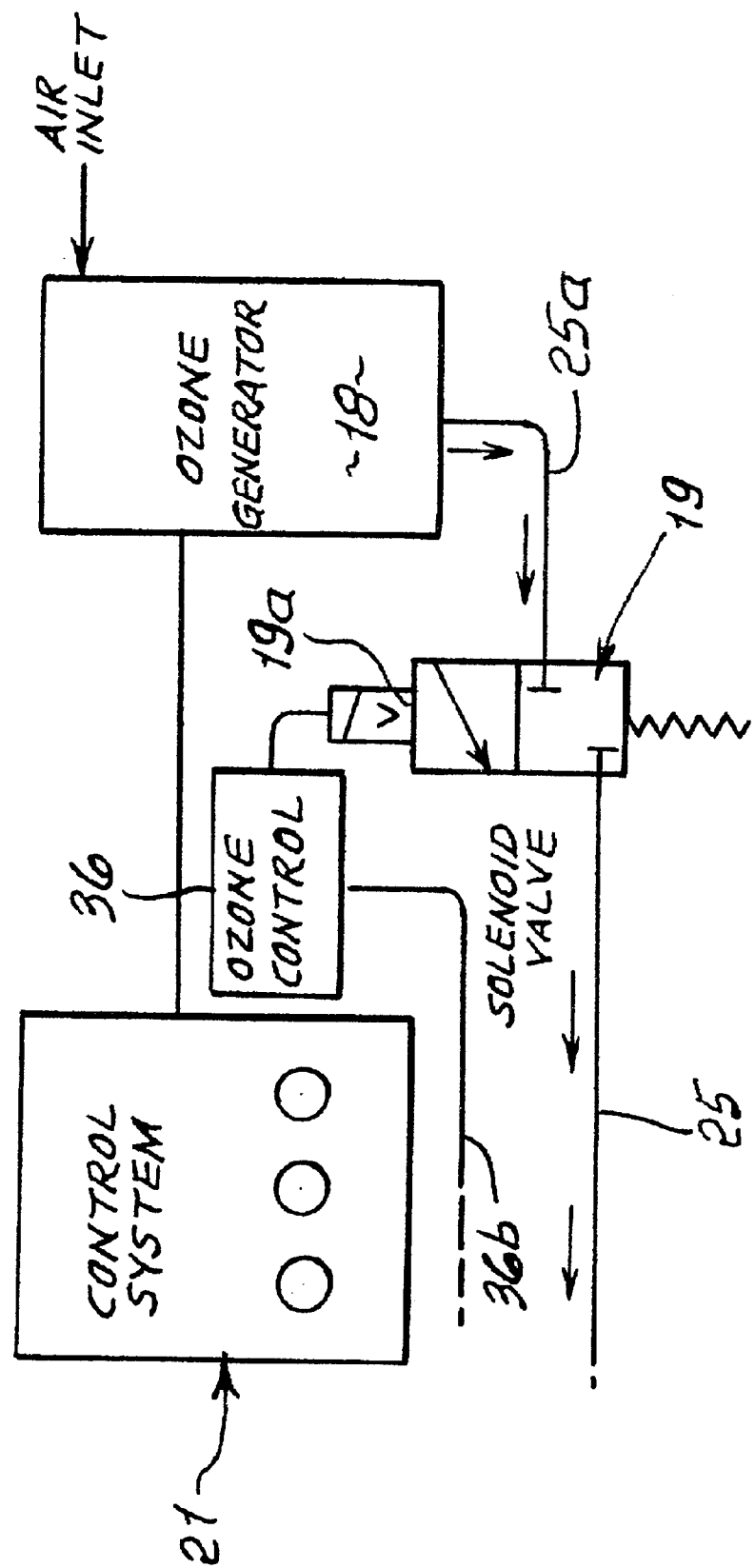
FIG. 8 is like FIG. 4, but shows ozone control of the solenoid valve.

FIG. 6 is like FIG. 5, except that the ozone flow in line 25 is to a jet unit 12, as in FIG. 1. FIG. 7 is like FIG. 5, except that the ozone flow in line 25 is to a line 31, controlled at 33 as in FIG. 3. FIG. 8 shows basic elements 21, 18, 25a, 25, 19, 19a, 36, and 36b as in FIGS. 5–7.

Figure 9:
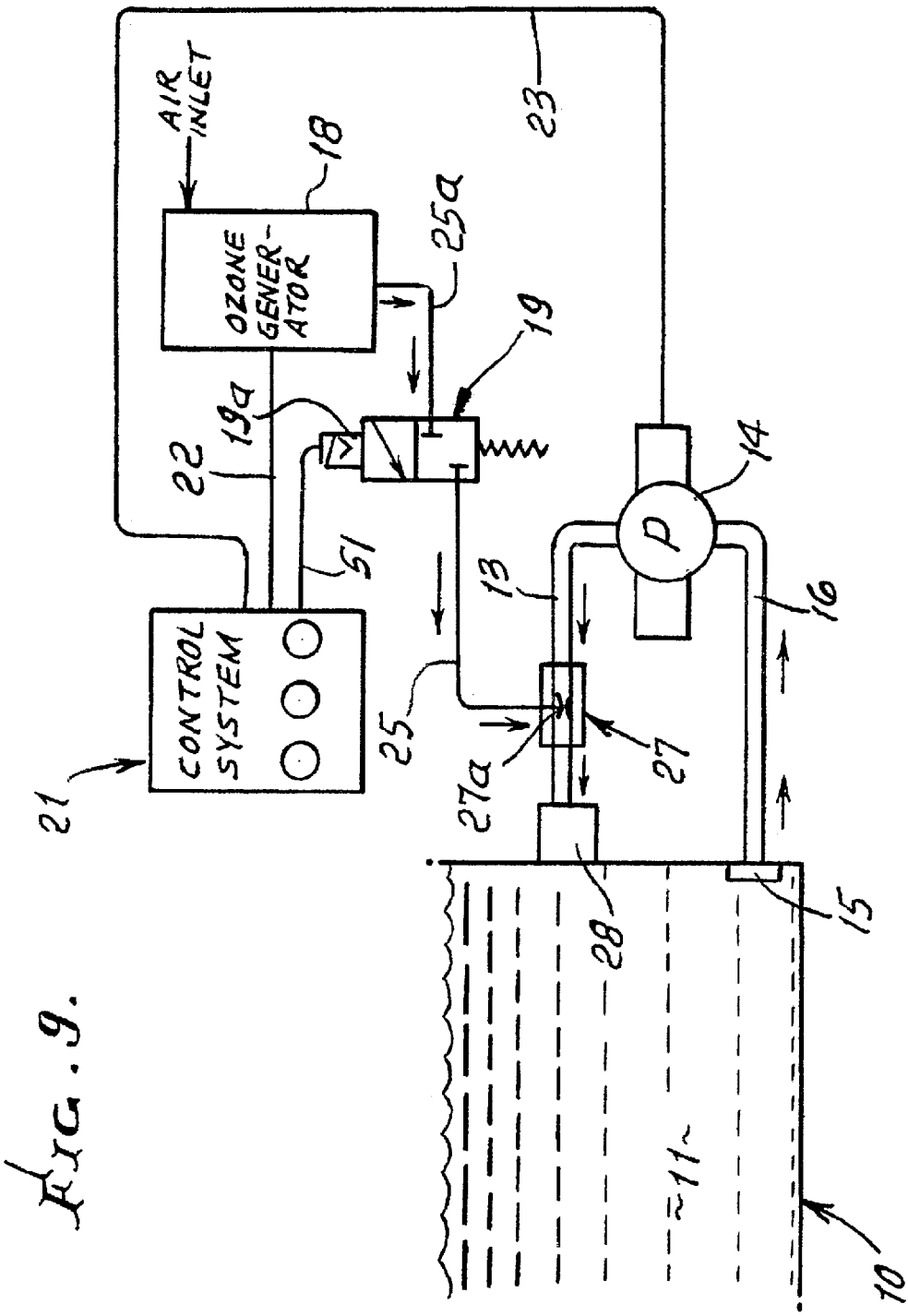
FIG. 9 is like FIG. 1, but shows control system control of the solenoid valve.

FIG. 9 is like FIG. 2, excepting that control line 50 in FIG. 2 is omitted, and a control line 51 from 21 controls the solenoid 19a, as in FIG. 1, for operator control of the solenoid (ON-OFF, for example).

Figure 10:
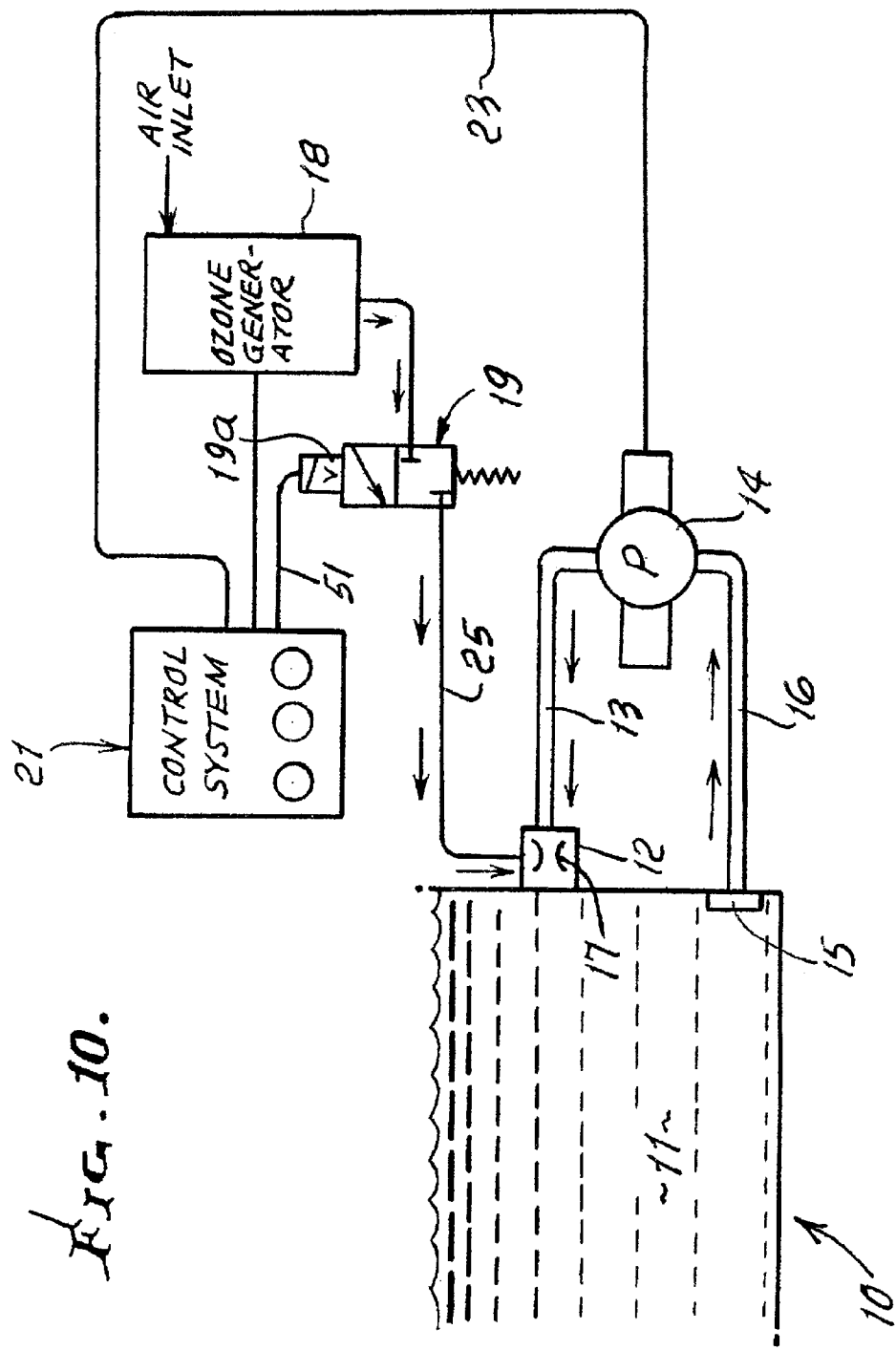
FIG. 10 is like FIG. 2, but shows control system control of the solenoid valve.
Figure 11:
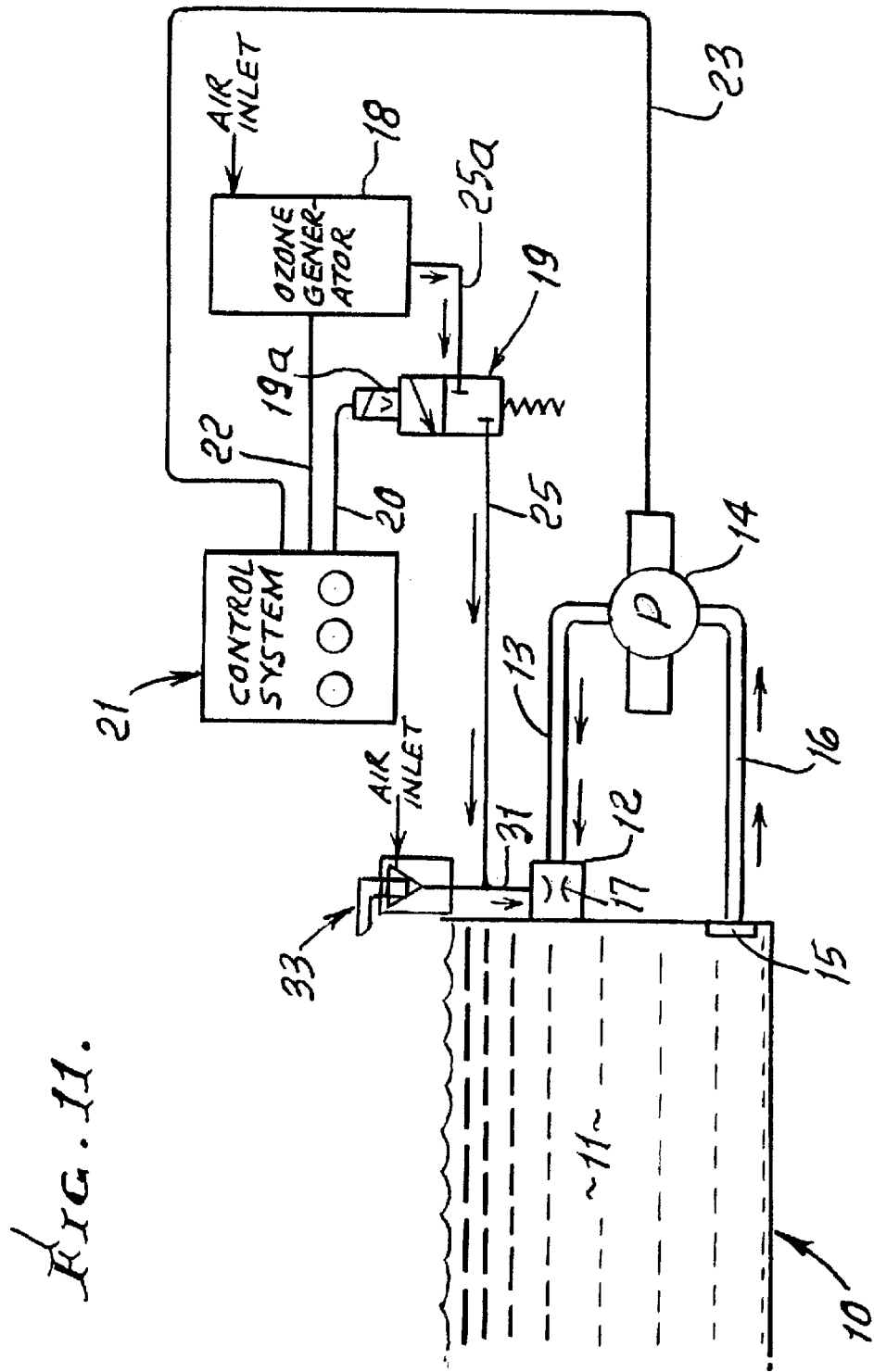
FIG. 11 is like FIG. 3, but shows control system control of the solenoid valve.

FIG. 10 is like FIG. 9, except that delivery line 25 connects to the jet unit 12, as in FIG. 1, instead of to an injector 27. FIG. 11 is like FIG. 10, except that line 25 connects to an air delivery line 31, as in FIG. 3.

FIG. 12 shows basic elements including control line 51, as in FIGS. 9–11.

I claim:

1. A method of controlling ozone supply to a pool or spa body of liquid, that includes
   a) providing an ozone generator,
   b) providing a control valve operatively connected to the generator to control flow of ozone to a pool or spa body of liquid, providing a solenoid operatively connected to the valve whereby the valve is solenoid controlled,
   c) providing a control for timing of operation of the valve, via the solenoid,
   d) and providing for controlled induced delivery of ozone directly via said valve to one of the following:
      i) air supply via a jet into the pool or spa
      ii) a re-circulating liquid supply via a jet into the pool or spa.

2. The method of claim 1 wherein said generator is provided in one of the following forms:
   i) UV bulb
   ii) corona-discharge bulb
   iii) corona-discharge microchip
   iv) a spark producing machine.

3. The method of claim 1 including providing a venturi via which said air or liquid is supplied to the pool or spa, and including aspirating ozone into the venturi to mix with said air or liquid, the suction of said aspiration acting to effect or induce flow of ozone through said control valve when the valve is open.

4. The method of claim 1 including providing a jet of said air or liquid into the body of liquid in the pool or spa, ozone being delivered to said jet.

5. The method of claim 4 including providing a line to pass re-circulated liquid from the pool or spa to said jet, and delivering ozone into said line, upstream of said jet.

6. A method of controlling ozone supply to a pool or spa body of liquid, that includes
   a) providing an ozone generator,
   b) providing a control valve operatively connected to the generator to control flow of ozone to a Pool or spa body of liquid, the valve being solenoid controlled,
   c) providing a control for timing of operation of the valve,
   d) and providing for controlled induced delivery of ozone via said valve to one of the following:
      i) air supply to the pool or spa
      ii) a re-circulating liquid supply to the pool or spa,
   e) providing a jet of said air or liquid into the body of liquid in the pool or spa, ozone being delivered to said let,
   f) and wherein delivery of ozone is directly to said jet.

7. The method of claim 4 including providing a line to pass air to said jet, and delivering ozone into said line, upstream of said jet.

8. The method of claim 4 including providing a line to said valve, and passing air and ozone to said line, upstream of said valve.

9. The method of claim 4 including first and second lines, the second line re-circulating liquid from said pool or spa and first line delivering air and ozone to the second line, via said valve.

10. A method of controlling ozone supply to a cool or spa body of liquid, that includes
    a) providing an ozone generator,
    b) providing a control valve operatively connected to the generator to control flow of ozone to a pool or spa body of liquid, the valve being solenoid controlled,
    c) providing a control for timing of operation of the valve,
    d) and providing for controlled induced delivery of ozone via said valve to one of the following:
       i) air supply to the pool or spa
       ii) a re-circulating liquid supply to the pool or spa,
    e) providing a let of said air or liquid into the body of liquid in the cool or spa, ozone being delivered to said let,
    f) and including first and second lines, the second line re-circulating liquid from said pool or spa and first line delivering air and ozone to the second line, via said valve,
    g) and wherein ozone is delivered to said first line at a jet adjacent the liquid in the pool or spa.

11. The method of claim 5 including controlling said air delivery.

12. The method of claim 1 including drawing ozone through the control valve, by suction, for delivery to one of the following:
    a) jet unit positioned to jet water into said body, said water having ozone directly delivered thereto,
    b) an injector unit in the path of water delivery to said body,
    c) a line delivering air for aspiration into water delivered to said body.

13. The method of claim 1 including providing a sensor to sense ozone concentration at said body of liquid, and using sensed ozone concentration to control operation of said control c).

14. The method of claim 1 wherein said step c) includes providing one or both of the following:
    an existing equipment controller
    an independent controller.

* * * * *